April 8, 1941. W. R. WILSON 2,237,954
NASAL FILTER AND INHALER
Filed June 30, 1939
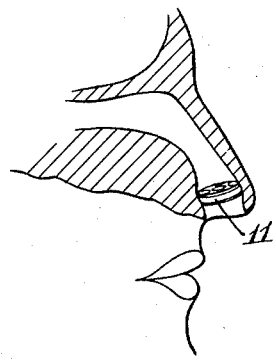
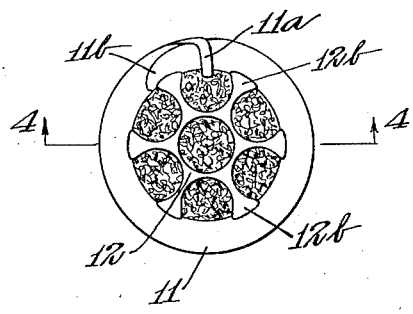
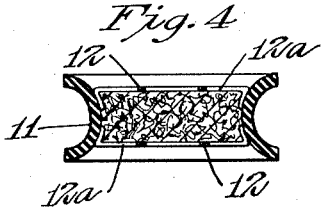
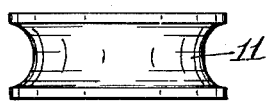
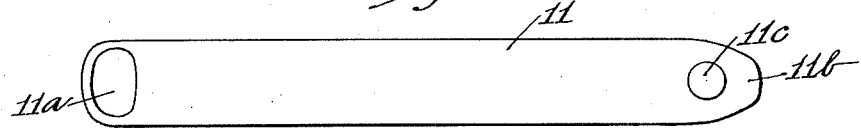
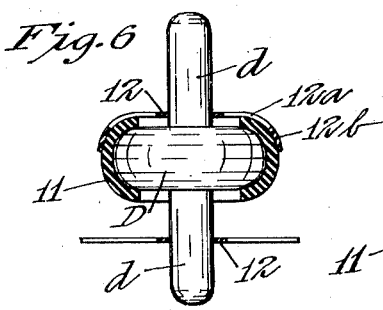
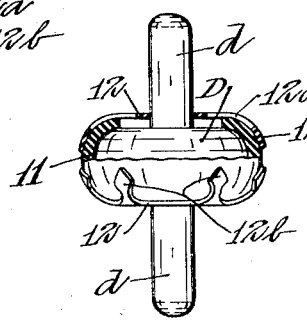
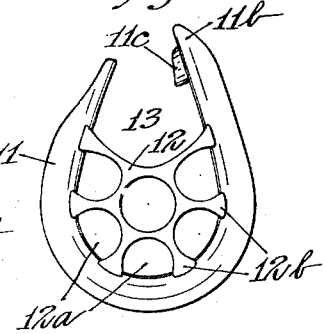
Inventor
William R. Wilson
By Williamson & Williamson
Attorneys Patented Apr. 8, 1941

2,237,954

UNITED STATES PATENT OFFICE 2,237,954

NASAL FILTER AND INHALER

William R. Wilson, Minneapolis, Minn.

Application June 30, 1939, Serial No. 282,094

8 Claims. (Cl. 128—148)

This invention relates to nasal filters and inhalers and is an improvement upon the construction disclosed in my United States Letters Patent No. 682,123, granted September 3, 1901, and entitled "Hay fever disk." The invention relates more specifically to improved appliances of small size adapted to be inconspicuously retained within the nostrils to effectively filter all air breathed by the user and to so exclude dust and pollen for the relief of sufferers from hay fever, asthma, sinusitis and other afflictions caused or accentuated by irritation of the passages of the nose, throat and sinuses.

It is an object of my present invention to provide an extremely simple but highly efficient nasal filter and inhaler adapted to be applied and comfortably retained in the nostril and universally adjustable for nostrils of various shapes and dimensions.

It is a further object to provide a pair of extremely light compressible nasal filters which are self-retaining in the nostrils which may be worn with comfort and which are constructed to permit the actual filtering material to be readily removed and replaced.

More specifically it is an object to provide nasal filters of the class described shaped in general disk form and constructed throughout, with, of course, the exception of the actual filtering material, from soft highly flexible material such as soft rubber, the periphery of the appliance or disk applying a slight pressure to the nasal passages for retention purposes, the body being constructed to form a chamber for retention of a thin layer of suitable filter material such as silk sponge, lambs wool or absorbent cotton. My invention is equally adapted for use as an inhaler or combined inhaler and filter since inhalant material may be applied to the filter material.

It is a further object to provide a simple, comparatively inexpensive and efficient method for making the nasal filters referred to herein.

These and other objects and advantages of the invention will more fully appear from the following description made in connection with the accompanying drawing, wherein like reference characters refer to the same parts throughout the views, and, in which:

Fig. 1 is a view of a portion of the human head, some parts being shown in section and illustrating the manner in which one of my nasal filters is applied in a nostril;

Fig. 2 is a plan view of an embodiment of the invention assembled with the filter material retained therein;

Fig. 3 is a side elevation of the same;

Fig. 4 is a cross section taken on the line 4—4 of Fig. 2;

Fig. 5 is a plan view of the rubber strip forming the annular frame of my improved filter;

Fig. 6 is a view partly in side elevation and partly in vertical section illustrating a suitable jig for use in making my device and illustrating the step of applying one of the transverse perforated partitions to the annular frame of my device;

Fig. 7 is a similar view illustrating the step of attaching the second partition to the frame;

Fig. 8 is a plan view of my filter device with the ends of the frame member disconnected and with the device reversed or turned inside out after being manufactured which is the last step in my method.

In the embodiment of my invention illustrated, a disk shaped elastic filter is provided for each nostril of the human nose comprising an annularly arranged frame member 11 which is constructed from a strip or band of soft flexible and elastic material such as rubber. This strip 11 has its ends adjustably connected together in a suitable manner to permit, when the device is assembled, a circumferential adjustment within limits of the entire device. As shown, I provide one end of strip 11 with an eye or loop 11a through which the opposite or tongue end 11b of the strip may extend. Friction is such when the appliance is worn to retain the annularly arranged frame member 11 in the various adjusted positions although I prefer to provide a short retainer stud 11c on the tongue 11b positively preventing disengagement of the ends when the device is not worn. Stud 11c may conveniently have a bevelled outer surface as shown in Fig. 8 to facilitate its insertion in the loop 11a.

A chamber for retaining filter material is provided in the device by means of a pair of spaced reticulated partitions or diaphragms 12 secured transversely to the annular elastic frame 11 across the upper and lower portions thereof. Both of these partitions are constructed of highly flexible thin elastic sheet material such as elastic rubber sheeting of the type used by dentists for damming the mouth, and these partitions are very coarsely reticulated, as shown being provided with a series of relatively large perforations 12a of such size that when the partition is stretched the filter cloth or filter material such as silk sponge, lambs wool or absorbent cotton may be inserted by a tweezers or otherwise within the chamber defined between said partitions and the inner periphery of the frame member 11. When the partitions are perforated in the manner illustrated a series of tabs 12b are formed which, as shown, are cemented or otherwise secured to the inner periphery of the frame 11 leaving a relatively wide opening 13 in the device when the ends of the frame member are disconnected (see Fig. 8). In utilizing my improved appliances, the ends of the frame or strip 11 are connected and properly adjusted so that the circumference of the disk comfortably fits the nasal pasage just above the slight thickened or enlarged portion at the end of the nose. The filter material or sheet is, of course properly disposed within the chamber between partitions 12 completely traversing the interior of the frame before application.

The outer concave edge of the disk, because of the elasticity of its material and the elasticity of the partitions, creates a slight pressure on the nasal passage making it positively self-retaining without any noticeable discomfort to the wearer. The entire disk is, of course, highly compressible and adapts itself perfectly to the cross sectional contour of the nasal passage where applied. This function and the circumferential adjustment of the frame 11 makes the device universally applicable to all human noses. My appliances when properly positioned in the nostrils are invisible and retain filtering material in such position that all air breathed through the nose of the user is filtered and all dust, pollen and foreign matter is excluded. Thus sufferers of hay fever, asthma, sinusitis, and other afflictions which are caused or aggravated by foreign irritants are greatly relieved, and in most instances the use of my improved appliances diminishes the susceptibility of the sufferer and restores a normal condition which in time will permit the afflicted to tolerate without the use of my appliances some quantity of pollen, dust or foreign material without discomfort.

The devices are equally applicable for use as inhalers since inhalant medicaments may be dropped or applied upon the filter material and the fumes therefrom inhaled in the normal breathing process at the same time the filtering of air is taking place.

I have provided a novel, simple, and highly efficient method for manufacturing my improved appliances. In carrying out the steps of my method the frame member 11 is first prepared by cutting out a suitable length from a band or strip of very flexible elastic material such as rubber. The adjustable retaining means are then formed on the strip and in the form of the invention shown one end of the strip is apertured to form the loop 11a and the stud 11c is formed in the other end, preferably by stamping a suitable perforation and fitting into the perforated portion a stud or pin which may also be constructed of rubber and of the proper diameter. The engaged end of the pin may be cemented to bind the two parts together. The strip so formed with the stud 11c projecting outwardly is then wrapped around a suitable jig, such as the rounded wheel or disk D, with the ends secured together by the stud and loop or by any other suitable means for retaining the strip 11 in annular form. The transverse partitions 12 are then prepared from disks or small pieces of preferably very thin flexible elastic material, such as elastic sheet rubber, and the perforations formed in the disks preferably in the arrangement shown in the drawing to provide open portions at the edge of the disk leaving the small tabs 12b. One of these perforations, it will be noted in the form shown, is centrally disposed and when the partition is applied to the annularly arranged frame member 11 it may be centered if desired by engagement of the central perforated part with a pin d on the top of the jig. The tabs or other parts defining the edge of the disk partition are respectively secured to the annular frame by extending the same over the upper portion of the periphery of strip 11 and applying cement or other securing means between the strip and partition tabs. After the upper partition is secured the lower partition is stretched or disposed across the opposite end of the annularly arranged strip 11 and the edges or tabs 12b thereof secured to the lower periphery of strip 11 in any of the manners previously described. It will be noted that the points of connection of the tabs 12b with the annular strip as shown are somewhat inwardly of the adjacent edge of the strip.

After the attachment of the partitions, the device is then removed from the jig and turned completely inside out, the attached tabs of the partition then being disposed on the inner peripheral wall or side of the annularly arranged strip as shown in Figs. 4 and 8. The application and attachment of the edges or tabs of the partitions, as described and illustrated, enable strong joints to be formed between the connected parts with the partitions properly arranged and distributed relative to the frame, and the consequent reversal of the entire device disposes the attached tabs within the annularly arranged strip and leaves the outer periphery of the frame or disk in concave form which is desirable for retention purposes.

From the foregoing description it will be seen that I have provided a simple, relatively inexpensive, universally adjustable filter appliance for human nostrils capable of positively retaining itself in position without discomfort to the wearer and compressible in all directions to meet requirements of variously shaped nasal passages and offering substantially no restriction to normal breathing through the nose if a light filtering substance is used.

It will further be seen that I have provided a simple, inexpensive and efficient process for making my improved nasal filters and inhalers which is responsible for the production of a highly efficient and extremely durable device. The connection of the edges or tabs of the partitions with the annularly arranged frame if made in accordance with my method are stronger than the webs or honeycomb portions of the partitions themselves.

It will, of course, be understood that various changes may be made in the form, details, arrangement and proportions of the various parts without departing from the scope of my invention.

What is claimed is:

1. The method of making a nasal filter which consists in arranging a strip of flexible material adapted to take variable shape in the form of a ring, preparing a pair of reticulated retention partitions constructed from thin flexible and elastic material, securing said partitions across the top and bottom edges of said strip respectively to form in conjunction with said strip a compartment for retaining filter material, and adjustably and frictionally interconnecting the ends of said member to form a circumferentially adjustable ring.

2. The method of making a nasal filter which consists in arranging a strip of flexible material in the form of a ring, preparing a pair of reticulated retention partitions constructed from thin flexible and elastic material, securing said partitions across the top and bottom edges of said strip respectively to form in conjunction with said strip a compartment for retaining filter material, and turning the structure so made inside out with the secured edges of said partitions disposed within the inner periphery of said ring.

3. The method of making a nasal filter which consists in arranging a strip of flexible material in the form of a ring, preparing a pair of reticulated retention partitions constructed from thin flexible and elastic material, said partitions being formed with tabs projecting from their peripheral edges, disposing said partitions transversely across the top and bottom portions of said ring and securing said tabs to the periphery of said ring, and turning said structure inside out to dispose said connected tabs within the inner peripheral wall of said ring.

4. A nasal filter comprising, an annularly arranged, flexible frame member adapted to take variable shape, constructed to be retained within a human nostril, and a pair of transverse spaced diaphragms completely traversing said frame adjacent the upper and lower ends respectively thereof and defining in cooperation with said frame a compartment for retaining said filter material, said diaphragms being constructed from very thin, highly stretchable and elastic material and having their peripheral portions secured to said frame, said diaphragms being apertured and at least one of said diaphragms having a filling aperture adapted to permit a wad of filter material to be inserted therethrough into said compartment when said last mentioned diaphragm is stretched.

5. A nasal filter comprising, an annularly arranged, flexible frame member adapted to take variable shape, constructed to be retained within a human nostril, and a pair of transverse spaced apertured diaphragms completely traversing said frame adjacent the upper and lower ends respectively thereof and defining in cooperation with said frame a compartment for retaining said filter material, said diaphragms being constructed from very thin, highly stretchable and elastic material adapted to yield without doubling or folding to conform to all shapes of the frame and means for securing the circumferential portions of said diaphragms to said frame.

6. A nasal filter comprising, a flexible, annularly arranged frame member adapted to take variable shape, one of the ends of said member having an eye through which the opposite end of said member is slidably and frictionally disposed for circumferential adjustment of said member, and means connected with said frame member forming therewith in all adjusted portions of said frame member a reticulated compartment for retention of filter material.

7. A nasal filter comprising, a flexible, annularly arranged frame member adapted to take variable shape, one of the ends of said member having an eye through which the opposite end of said member is slidably and frictionally disposed, for circumferential adjustment of said member, and a pair of spaced, transverse, apertured diaphragms of thin, highly flexible and elastic sheet material having their circumferential edges secured to said frame member and forming with said frame member a reticulated compartment for retention of filter material.

8. The structure set forth in claim 7, said partitions being permanently connected in slightly stretched relation with said frame member, and at least one of said partitions being apertured to permit, when stretched, a wad of filter material to be inserted into said compartment therethrough.

WILLIAM R. WILSON.